(12) United States Patent
Leary (10) Patent No.: US 10,427,304 B2
(45) Date of Patent: Oct. 1, 2019

(54) ROBOTIC CHARGER ALIGNMENT

(71) Applicant: Powerhydrant LLC, Westwood, MA (US)

(72) Inventor: Kevin Walter Leary, Westwood, MA (US)

(73) Assignee: POWERHYDRANT LLC, Westwood, MA (US)

( * ) Notice: Subject to any disclaimer, the term of this patent is extended or adjusted under 35 U.S.C. 154(b) by 176 days.

(21) Appl. No.: 15/692,583

(22) Filed: Aug. 31, 2017

(65) Prior Publication Data
US 2018/0056801 A1 Mar. 1, 2018

Related U.S. Application Data

(60) Provisional application No. 62/382,383, filed on Sep. 1, 2016.

(51) Int. Cl.
*B60L 53/36* (2019.01)
*B25J 9/16* (2006.01)
(Continued)

(52) U.S. Cl.
CPC ............ *B25J 9/1692* (2013.01); *B25J 9/023* (2013.01); *B25J 9/1697* (2013.01); *B60L 53/305* (2019.02); *B60L 53/36* (2019.02); *B60L 53/37* (2019.02); *B60L 53/65* (2019.02); *G01B 11/2504* (2013.01); *G06K 9/00201* (2013.01); *G06K 9/00214* (2013.01); *G06K 9/3241* (2013.01); *G06K 2209/40* (2013.01); *Y02T 10/7005* (2013.01); *Y02T 10/7088* (2013.01); *Y02T 90/121* (2013.01); *Y02T 90/125* (2013.01);
(Continued)

(58) Field of Classification Search
CPC .................. Y02T 90/125; B60L 53/36–37
See application file for complete search history.

(56) References Cited

U.S. PATENT DOCUMENTS 6,157,162 A * 12/2000 Hayashi ............... H02J 7/0027
320/104
7,999,506 B1 * 8/2011 Hollar ..................... B60L 53/34
320/104
(Continued)

OTHER PUBLICATIONS

Bertram Drost et al, "Model Globally, Match Locally: Efficient and Robust 3D Object Recognition," The 23rd IEEE Conference on Computer Vision and Pattern Recognition, CVPR 2010, Jun. 2010; 8 pages.

*Primary Examiner* — Ryan Rink
(74) *Attorney, Agent, or Firm* — Atesa Legal PLLC (57) ABSTRACT

A system and method for robotic charger alignment comprises receiving at a robotic charger, a device identification of a receiving device; retrieving a reference object (RO) of the receiving device from a database indexed by the device identification; imaging the receiving device to form at least two images having an angle therebetween with respect to a common location on the receiving device; calculating, by an alignment processing device, a stereo disparity depth map from the at least two images; acquiring an acquired point cloud (APC) from the stereo disparity depth map; generating, by the alignment processing device, rotation and translation data by aligning the RO to the APC; inferring an inlet port location from the RO; and moving the robotic charger proximal to the inlet port using the RO, Rot and T data.

20 Claims, 4 Drawing Sheets (51) Int. Cl.
*G06K 9/00* (2006.01)
*B25J 9/02* (2006.01)
*G01B 11/25* (2006.01)
*B60L 53/37* (2019.01)
*B60L 53/65* (2019.01)
*B60L 53/30* (2019.01)
*G06K 9/32* (2006.01)

(52) U.S. Cl.
CPC .............. *Y02T 90/128* (2013.01); *Y02T 90/14* (2013.01); *Y02T 90/16* (2013.01); *Y02T 90/163* (2013.01); *Y02T 90/169* (2013.01); *Y04S 30/14* (2013.01)

(56) References Cited

U.S. PATENT DOCUMENTS

| | | | |
|---|---|---|---|
| 8,169,186 B1* | 5/2012 | Haddad | B60L 53/65 320/109 |
| 8,473,131 B2 | 6/2013 | Leary | |
| 8,718,856 B2 | 5/2014 | Leary | |
| 8,830,229 B2 | 9/2014 | Drost et al. | |
| 2011/0035051 A1* | 2/2011 | Kim | B25J 9/1666 700/246 |
| 2011/0077809 A1* | 3/2011 | Leary | B60L 53/34 701/22 |
| 2011/0254504 A1* | 10/2011 | Haddad | B60L 53/65 320/109 |
| 2012/0233062 A1* | 9/2012 | Cornish | B25J 11/00 705/39 |
| 2015/0042278 A1* | 2/2015 | Leary | B60L 11/1824 320/109 |
| 2015/0343912 A1* | 12/2015 | McNally | B60L 11/1816 320/109 |
| 2016/0016312 A1* | 1/2016 | Lawrence, III | G01B 11/24 700/98 |
| 2017/0120448 A1* | 5/2017 | Lee | B25J 9/1666 |
| 2017/0136902 A1* | 5/2017 | Ricci | B60L 11/1825 |
| 2017/0225583 A1 | 8/2017 | Chai et al. | |

* cited by examiner

FIG. 5 ns device and a vehicle

ROBOTIC CHARGER ALIGNMENT

RELATED APPLICATIONS

This application claims the benefit of U.S. Provisional Patent Application No. 62/382,383 filed on Sep. 1, 2016 entitled "Robotic Device Alignment," the content of which is incorporated herein by reference in its entirety.

FIELD

This disclosure relates generally to precise three-dimensional (3D) object sensing, and more specifically to aligning a robotic charger to a 3D object in an unconstrained lighting environment.

BACKGROUND

Precise 3D sensing typically requires an expensive 3D camera and either structured lighting or a reference light source for the object of interest. However, bright sunlight can interfere with this approach during sensing by the 3D camera. For example, the intensity of the sunlight can reduce the required contrast for accurate imaging or overwhelm light from reference light sources used in other techniques. In addition, the use of a high-powered light source to overcome bright ambient sunlight may pose potential risks with respect to damaging the human eye caused by both directed and reflected light.

BRIEF SUMMARY

In one aspect, a method for robotic charger alignment comprises receiving at a robotic charger, a device identification of a receiving device; retrieving a reference object (RO) of the receiving device from a database indexed by the device identification; imaging the receiving device to form at least two images having an angle therebetween with respect to a common location on the receiving device; calculating, by an alignment processing device, a stereo disparity depth map from the at least two images; acquiring an acquired point cloud (APC) from the stereo disparity depth map; generating, by the alignment processing device, a rotation (Rot) and a translation (T) data by aligning the RO to the APC; inferring an inlet port location from the RO; and moving the robotic charger proximal to the inlet port using the RO, Rot and T data;

In another aspect, a method for alignment of a robotic charger to a three dimensional (3D) object comprises: generating, by each of two 2D cameras separated by a predetermined distance, an image of the 3D object; calculating, by an alignment processing device, a stereo disparity depth map from the images; acquiring an acquired point cloud (APC) from the stereo disparity depth map; retrieving from a data repository a reference object of the 3D object; aligning the reference object with the APC; inferring a location of a region of interest of the reference object; and moving a robotic apparatus proximal to the region of interest in response to inferring the location of the region of interest.

In another aspect, a system for object detection and alignment of a robotic charger with a vehicle to be charged by the robotic charger comprises: a sensing device that captures images of a region of interest of the vehicle from two different angles; and an alignment processing device that calculates a stereo disparity depth map from the images; generates an acquired point cloud (APC) from the stereo disparity depth map, compares the APC and a reference object of the vehicle, and infers a location of a region of interest of the vehicle in response to the comparison.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Reliable sensing of the location of a 3D object under a variety of lighting conditions is very challenging because the intensity of sunlight can interfere with a sensing operation performed by a camera or related electronic detection device. The use of high power lighting sources to improve contrast is also limited by the potential eye health hazards that may result from use. Accordingly, there is a need for a system that provides device alignment such as a robotic charger to a 3D object (e.g., receiving device), which must be accomplished with precision under a variety of environmental conditions, including bright back lighting, reflected ambient lighting, and no lighting.

In some embodiments of the present inventive concept, a robotic device includes a robotic charger and the 3D object, which must be aligned with an electric or hybrid vehicle, although the teachings of this disclosure are not limited to vehicles. Typically, 3D sensing has required complicated means such as projecting a structured or reference light source on the object to be sensed. Advantageously, by exploiting constraints and situational knowledge, 3D sensing can be accomplished without structured or reference light sources.

Specifically, by exploiting and expecting the rigidity of a solid object, such as an electric vehicle (EV), due to the assumption that a virtual rigid object will have the same shape as the identified real object. Since augmented reality alignment of virtual rigid objects is used to sense data from a real rigid object, the system can rely on the rigidity expectation to perform an alignment calculation applying an iterative closest point (ICP) algorithmic technique or the like that may be embodied in software, stored in a computer memory device, and executed by a hardware processor, and then mathematically infer an inlet port location or other region of interest of the vehicle and also establish a collision map. An example of an ICP algorithm is provided by B. Drost, M. Ulrich, N. Navab, and S. Ilic published at Computer Vision and Pattern Recognition, CVPR 2010, on Jun. 13, 2010, San Francisco, Calif., USA, entitled "Model globally, match locally: Efficient and robust 3D object recognition," the contents of which are incorporated by reference in their entirety. This may include identifying a feature of the solid object with sufficient resolution in a 3D space coupled with a referenced model of the solid object, a similar resolution of any physical point on the solid object is obtained. The solid object model is communicated to a robotic device or intermediate device by a radio interface. In one example, the EV transmits an identifying code that is used to retrieve a solid model from a database. Accordingly, a low cost system, for example, including inexpensive stereo 2D sensors, for example, passive sensors, may be used that are suitable for broad deployment in an EV charging infrastructure without the complexity of existing systems based on structured or reference lighting and is robust to any lighting environment. For example, passive sensors may be used that simply require the natural visible light that is incident on the image plane via a low cost (plastic) lens, and not required to produce structured light or require time of flight light sources that are synchronized to the image sensor pixels.

In contrast to the sensing and computational needs for autonomous vehicles, robotic chargers for vehicles require the determination of the target vehicle rotation and translation data to a higher accuracy and precision, e.g. on the order of 2 degrees for rotation, and 1 cm for translation. Autonomous vehicles need to plan a path, see the path, and detect, predict, sense and react to obstructions. In contrast, a robotic charger for vehicles requires low-cost, robustness over a wide range of lighting conditions, and precision for 3D sensing.

By exploiting opportunities and constraints specific to a Computer Vision Directed Robotic Conductive Charger, and similar applications, a simple, fast, low-cost, robust computer-vision directed robotic scheme of an a priori determined, e.g., by way of radio link complying with a 802.11p protocol, between the target vehicle and vehicle charger, a solid model alignment to sensed 3D sparse point cloud can be achieved. In particular, by exploiting the inherent expectation that vehicles are rigid and the ICP scheme operations under this inherent expectation, the system presumes that a vehicle will have a radio or related device to communicate with.

The core software algorithmic elements used in this technique may apply to the sparse point cloud despite the quality of resulting images that may be produced, allowing for a more complete virtual information about the scene to be determined thereby allowing for inlet port location to inferred and collision map data to be created In particular, a disparity mapping technique may be applied with respect to the two sensors used to collect the image data and separated from each other by a predetermined distance. In some embodiments, the technique may provide for stereovision disparity-based point-cloud generation and iterative closest point (ICP). Even with limited image data (e.g., just imaging data for the front right quadrant of vehicle), alignment of the solid model to the sparse point cloud allows for any rotation and translation data for any sub components of the target vehicle to be inferred. Accordingly, this technique is ideally implemented on fully commoditized components ensuring low-cost, reliable implementation, and robust usability. This technique does not require structured light or time-of-flight and therefore will work across all real-life lighting scenarios: for example, ranging from pitch dark, via non-structured IR illumination, to mid-day full sunlight, because high quality images of a vehicle of interest that may be affected by sunlight or other lighting-related effects are not required, and instead, an inference is made of a location of a charging inlet for receiving a source of electricity from a robotic charger.

Figure 1:
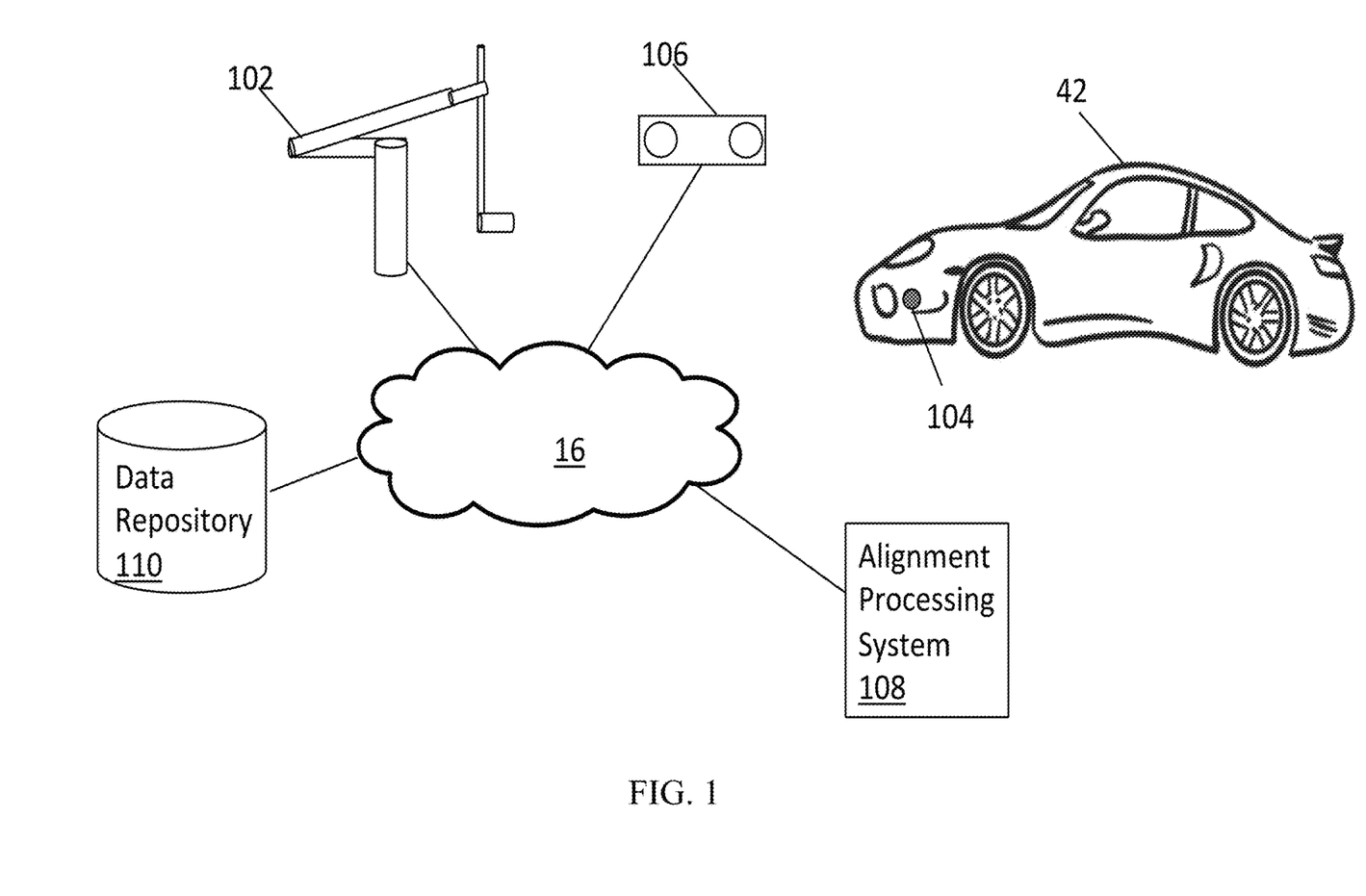
FIG. 1 is a block diagram of a system for object detection and alignment, according to some embodiments.

FIG. 1 is a block diagram of a system 100 for object detection and alignment, according to some embodiments.

In some embodiments, the system 100 includes, but is not limited to, a robotic charger 102, a sensing device 106, an alignment processing device 108, and a data repository 110. Some or all of these elements of the system 100 may communicate with each other via a network 16. The network can be a local area network (LAN), a wide area network (WAN), or other wireless and/or wired communications network for transmitting electronic data. In other embodiments, some or all of the elements of the system 100 may exchange data directly with each other, i.e., without intervening switches, routers, computer servers, or the like of the network 16.

The robotic charger 102 may include an armature, charging panel, and so on for charging an energy storage unit of an object such as a vehicle 42, for example, by interfacing or otherwise communicating with an inlet port 104 of the vehicle 42, for example, similar or the same as that described in U.S. Pat. No. 8,473,131, entitled "Method and system for Charging Electric Vehicles," incorporated by reference herein in its entirety.

The sensing device 106 is constructed and arranged to capture images of an object of interest from two different angles. In doing so, the sensing device 106 includes two sensors such as cameras positioned on an elongated element such as a bar, frame, or the like, and separated from each other by a predetermined distance, for example, the centers the two sensors are separated by 120 mm.

Figure 2:
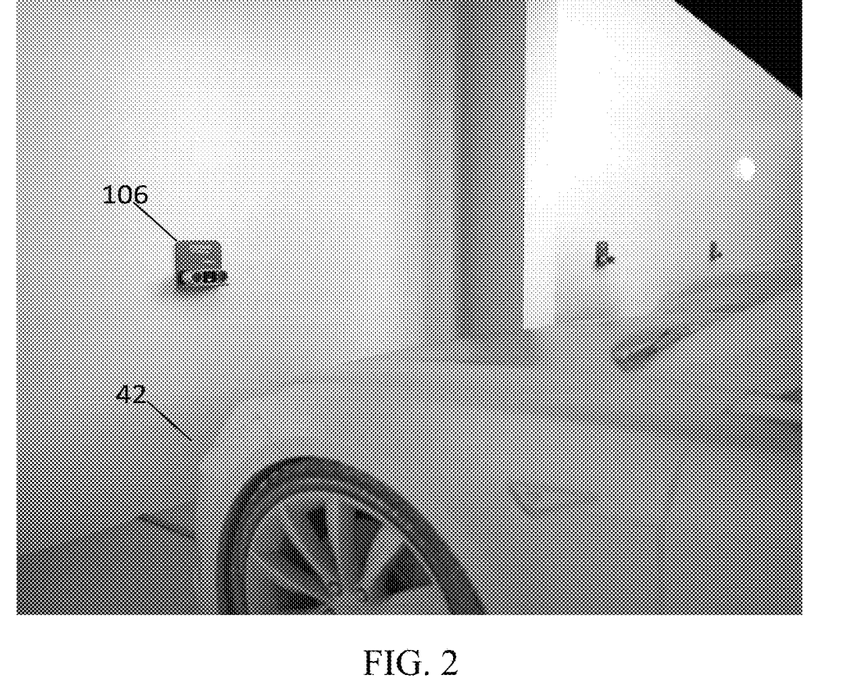
FIG. 2 is a diagram of a sensing device and a vehicle of interest, in accordance with some embodiments.
Figure 3:
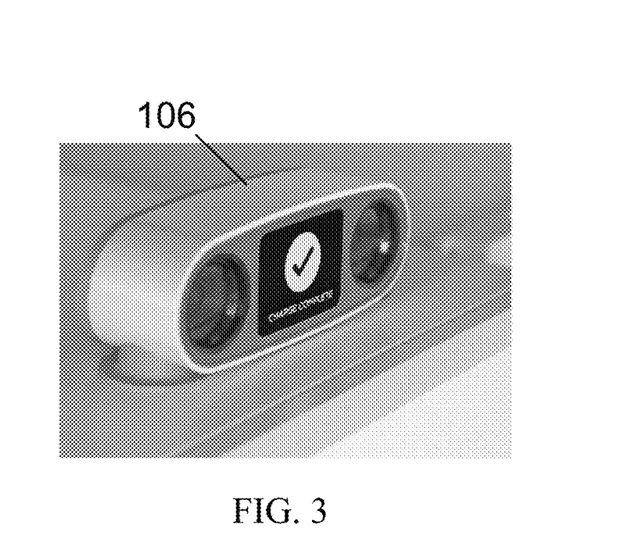
FIG. 3 is an enlarged view of the sensing device of FIG. 2.

As shown in FIGS. 2 and 3, the sensing device 106 is positioned on a wall or other surface facing the vehicle 42. In other embodiments, the sensing device 106 is integrated into the robotic charger 102. Here, the alignment processing device 108 is configured to adapt, or offset, with respect to translation (e.g., x, y, z coordinates) and rotation (e.g., pointing direction) the location of the sensor 106.

Figure 4:
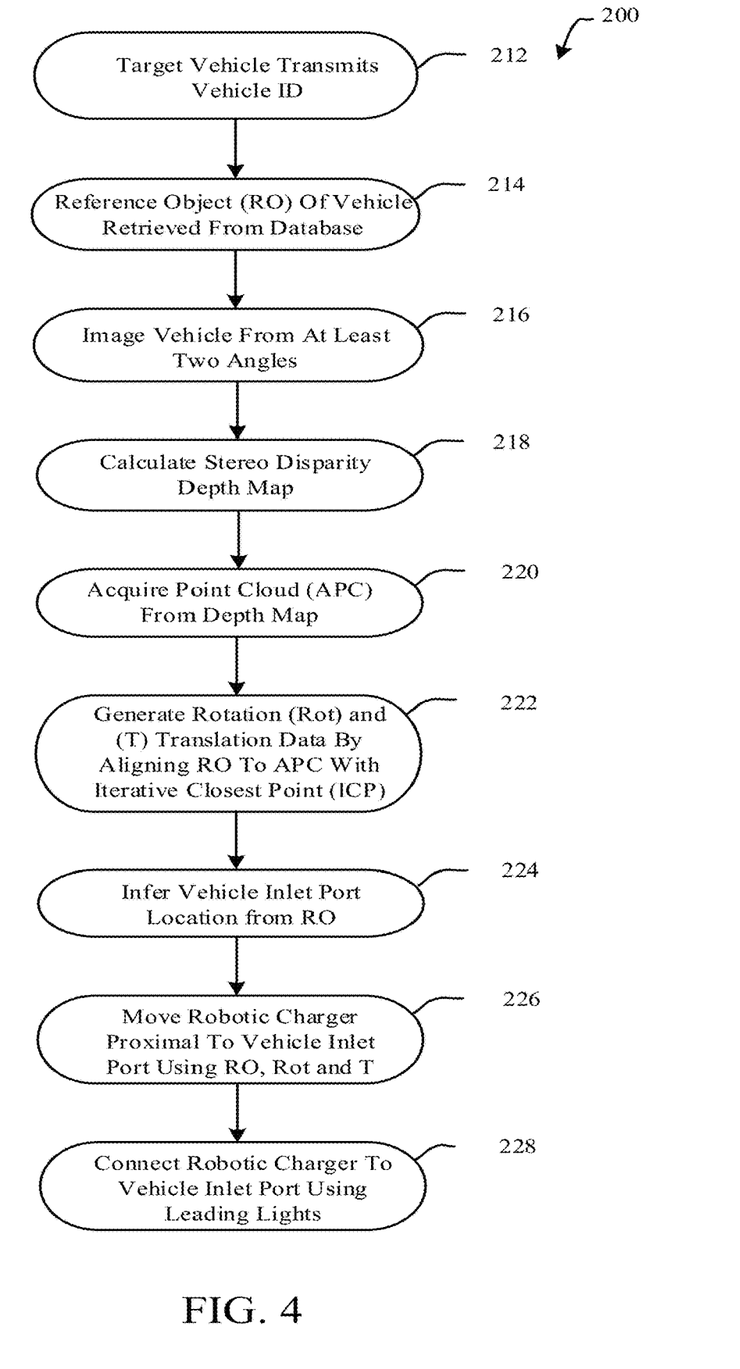
FIG. 4 is a flowchart view of a method of robotic charger alignment, according to some embodiments.

The alignment processing device 108 executes some or all of a method 200 described in FIG. 4, including but not limited to point cloud generation, ICP, and so on. For example, computer program instructions for executing the method 200 may be provided to a special purpose computer of the alignment processing device 108, and can direct the alignment processing device 108 to function in a particular manner according to the method 200.

The data repository 110 is constructed and arranged to electronically store a library of reference objects (RO) 44, which includes a plurality of rigid solid models of vehicles that are supported by and capable of being charged by the robotic charger 102. For example, a data communication with the vehicle 42 may establish that the vehicle 42 is of a particular make and model, which is identified in the data repository 110. The library may be maintained and updated by automatic updates received electronically, for example, as over the air (OTA) updates via the network 16.

Figure 5:
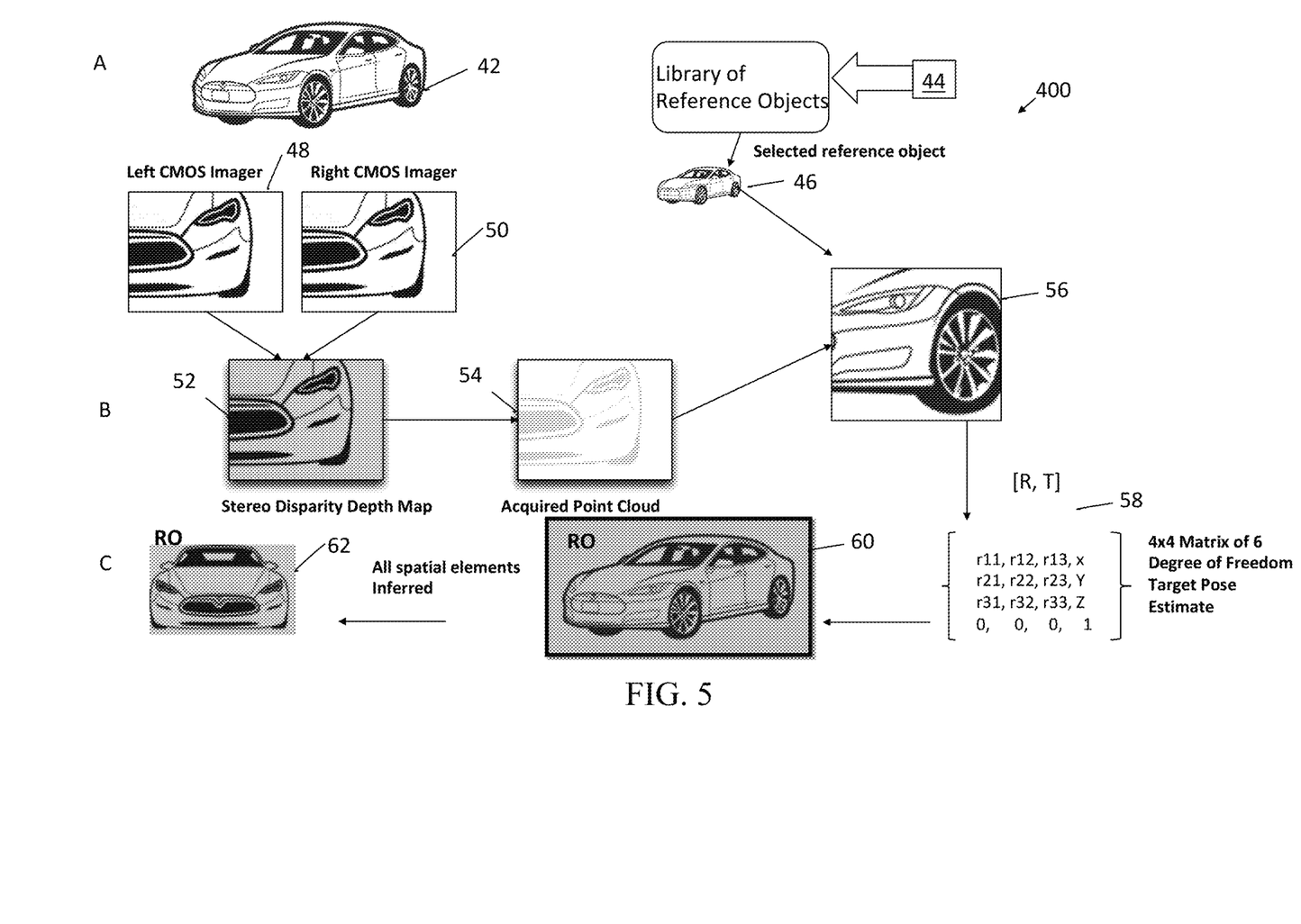
FIG. 5 is a graphical view of the method of FIG. 4, according to some embodiments.

With reference to FIG. 4, a method 200 for robotic charger alignment is described. FIG. 5 expands upon the system 100 of FIG. 1 and the method 200 of FIG. 4 with pictorial images. The method of FIG. 4 provides for the detection of a vehicle inlet port 104, e.g., charging port, alignment of a robotic charger or connector or the like to the vehicle inlet port 104, and path-planning for connecting the charge or connector to the vehicle inlet port 104 while preventing the robotic charger 102 from colliding with either the vehicle or another intervening object.

At step 212, the target vehicle communicates a vehicle ID to a robotic charger 102, which accesses a library of reference objects (RO) 44 stored at the data repository 110. The vehicle ID can be in addition to and more general than a vehicle identification (VIN). In one embodiment, the vehicle ID includes a make and model of the vehicle of interest, including such identifying information as to locate the vehicle inlet port 104 used for receiving charge relative to features that are imaged by at least two imagers (described below). In some embodiments, an infrared floodlight supplements the imagers for use in dark environments. In another embodiment, the vehicle ID includes modifications and protrusions to the vehicle that might interfere with a path between the robotic charger 102 and the vehicle inlet port 104. In another embodiment, the vehicle ID also includes charging characteristics of the vehicle, such as charge capacity and required charging rate.

At step 214, an RO 46 appropriate for the received vehicle ID is retrieved from the data repository 110. The RO 46, and all other entries in the library, is a computer data file describing a raw unstructured triangulated physical dimension accurate spatial surface by spatial vertices of the triangles using a three-dimensional Cartesian coordinate system. The system may use and comply with any of several industry standard file formats. In some embodiments, data of the RO 46 is acquired by a third party supplier. The RO complete surface can be used by collision avoidance and path planning software, for example, executed by a computer, to avoid hitting the vehicle during an articulation of the charger 102 once the complete model of the virtual vehicle is placed by the ICP. The data file will include supplementary translation and rotation data, e.g., 6 floating point data points: X, Y, Z, roll, pitch, and yaw indicating the offset from the zero reference point of RO to the inlet port point location and orientation. After a vehicle alignment process is performed according to embodiments, a simple offset (e.g., translate and rotation) shows the inlet port location, whereby the inlet port location can be mathematically inferred.

The library 44 stored at the data repository 110 includes a plurality of ROs, for example, thousands of ROs or more, where each RO corresponds to a different vehicle, for example, classified by size, type, manufacturer, model, and so on. An RO matching the vehicle ID is then retrieved from a database. The RO is a solid model of the vehicle. Here, the library stores a plurality of solid models and the RO is the selected solid model in response to an electronic signal received from the vehicle 42, for example, via radio communication. The solid model and selected RO and/or all other entries in the library is a computer data file describing a raw unstructured triangulated physical dimension accurate spatial surface by spatial vertices of the triangles using a three-dimensional Cartesian coordinate system. In some embodiments, an industry standard file format is used. The data can be acquired from a third party supplier. In one example, as shown in FIG. 5, the vehicle 42 communicates with the library 44 of ROs either directly or through the robotic charger using a machine-to-machine (M2M) radio interface, communication protocol, and so on. For example, a radio standard such as ZigBee IP6LoPan WIFI BT or 3G/4G/5G may be used, but not limited thereto. In some embodiments, a communication protocol such as IEEE 802.15, WPAN Low Rate/Zigbee, Bluetooth, IrDA, and so on may be used, but not limited thereto.

In various examples, the M2M is based on a standard for Wireless Access in Vehicular Environments (WAVE), such as the IEEE standard 1609.n.

At step 216, the target vehicle is imaged from at least two angles, for example, using the sensing device 106 illustrated in FIGS. 2 and 3. In various embodiments, the sensing device 106 includes a stereo camera, a pair of charge coupled device (CCD) or complementary metal-oxide-semiconductor (CMOS) cameras, or the like, that capture a left (L) and a right (R) image. For example, as shown in FIG. 5, a left CMOS imager and right CMOS imager produce images 48 and 50 respectively of a region of interest of the vehicle 42, in particular, a region including an inlet port 104 for receiving the charger 102. In some embodiments, a camera calibration operation may be performed with respect to robotic binocular stereo vision in order to extract information from the 2D images relevant to performing subsequent algorithmic steps of the method 200. For example, binocular calibration may be required for the system to ascertain both intrinsic and extrinsic parameters, as well as the relative position relation of the two cameras of the sensing device 106, which in turn are used to create an accurate render point map. Intrinsic parameters may include but not limited to camera parameters such as focal length, principal point, skew coefficients, optical center or principal point, or other camera characteristics or features. Extrinsic parameters correspond to rotation and translation vectors used to transform 3D point coordinates to a point in another coordinate system, for example transforming a point from world coordinate system to camera coordinate system. The intrinsic and extrinsic parameters of the cameras along with calibration data can be stored at the data repository 110. Calibration in this manner permits low-cost sensors to be used.

At step 218, a stereo disparity depth map (DDM) 52 is calculated from the left (L) 48 and right (R) stereo images 50 generated in step 216 using a disparity technique (e.g., DDM(L,R)). In particular, the two images 48, 50 are compared to obtain relative depth information. In some embodiments, the DDM 52 may be generated by performing a triangulation technique on image data that is determined to be the same representative image data from two separate image sensors in a calibrated stereo camera system. The relative pixel level displacements of the source of the two image data sets and the known separation distance of the image sensors and the lens properties are adequate to calculate a depth map. The depth map can then be operated upon to yield the 3D point cloud 54. The producing of the DDM 52 in this manner permits the system 100 to provide reliable determination of a sparse 3D point cloud for sensing of the location of the envelope of the vehicle 42 under a variety of lighting conditions, regardless of exposure to direct sunlight, which would otherwise prevent reliable 3D alignment from occurring when used by a conventional 3D camera.

At step 220, the depth map is translated, or converted, into a 3D acquired point cloud (APC). For example, the alignment processing device 108 may determine the APC 54, shown in FIG. 5 according to the equation: APC=CLD [DDM(L,R)]. In comparing information about a scene, i.e., a relevant region of a vehicle of interest, from two vantage points, 3D information can be extracted by examination of the relative positions of objects in the two panels.

At step 222, rotation (Rot) and translation (T) data are generated, for example, by the alignment processing device 108, to align the selected RO with the generated APC. In various embodiments, the alignment is achieved using an iterative closest point (ICP) method or the like, where the APC is held as a spatial reference (e.g., not moved) and the RO is rotated and translated to a planned map or the like to find the spatial translation and rotation data that most closely aligns the RO to the APC, for example, according to the following equation: [Rot,T]=ICP[RO,ACP]. With reference to FIG. 5, the selected RO 46 and the APC 54 are shown in alignment at an ICP 56. Preferably, the rotation Rot includes a rotation about three axes that are orthogonal to each other, e.g., well-known x, y, and z axes. The translation T may include a translation in three axes, and in limited use cases, a subset of the three axis for each of Rot and T sufficient for alignment. In various embodiments, the Rot and T information is expressed as a well-known "4×4" matrix, for example, shown as matrix 58 in FIG. 5, which may be generated by the alignment processing device 108, including a corresponding six degree of freedom (DOF) target post estimate. Accordingly, Rot and T combined with the RO produces a complete virtual data set of the target vehicle shape and location in space. A complete augmented reality view 60 of the aligned virtual model, i.e., as the actual vehicle 42 is, relative to two images provides a complete virtual construction of the real scene that is created. A virtual (but correctly placed to match reality) superimposed view 62 of stereo camera images (they are overlapped and hard to distinguish from each other may also be generated.

At step 224, after the virtual model alignment step of step 222, the vehicle inlet port 104, i.e., for receiving a charger such as a robotic charger described herein, of the vehicle 42 is inferred from the RO model, as are any protrusions or other features of the target vehicle 42. For example, the spatial elements of the model can be inferred, or otherwise estimated, by the alignment processing device 108, for path planning, collision avoidance, or other reasons regarding the operation of the robotic charger 102 communicating with the vehicle 42. The inference data may be provided to a special purpose processor of the robotic charger 102 for use in a subsequent determination of where to move the charger 102 to perform a charging operation or other communication with the vehicle 42. Thus, the original stereo image pair and point cloud do not need to include the image of the inlet port 104, and is instead inferred. As described above, the RO complete surface can be used by collision avoidance and path planning software once the complete model of the virtual vehicle is placed by the ICP. The data file may include supplemental translation and rotation data indicating the offset from the zero reference point of the RO to the inlet port point location and orientation. Once the virtual vehicle aligned, a simple offset, e.g., translate and rotation, shows the inlet port location.

At step 226, the robotic charger 102 is articulated to the vicinity of the vehicle inlet 104 in response to electronic signals output from the alignment processing system 108 to the special purpose processor of the robotic charger 102, which are generated using the RO model together with the rotation Rot and translation T data, for example. In some embodiments, the robotic charger 102 is moved across the shortest distance to be proximal to the vehicle inlet 104. In other embodiments, the robotic charger 102 is moved along an indirect path, defined by a collision map generated by the translation and rotation RO to avoid other vehicle features or intervening objects. In some embodiments, only the aligned RO and pre-stored information about the installation location (like a wall) are a priori known and provide to path planning software as collision map data and to be avoided for movement. Other unexpected objects may be sensed by ultrasound sensors and stop the robotic charger 102 from articulating during a charging operation, for example, a person walking into the path between the charger 102 and the vehicle 42. Therefore, by starting with a reference object RO identified in a library of reference objects and two images L and R, a complete augmented reality scene is provided, thus enabling the robotic charger to be moved to the vicinity of the vehicle inlet port. With the entire vehicle solid model RO properly translated and rotated in the augmented reality, shown by element 60 in FIG. 5, the vehicle inlet 104 is inferred even if not captured in the initial image set (e.g., L and R images produced by sensors). Furthermore, collisions between the robotic charge, the target vehicle and any intervening objects are avoided.

At step 228, the final connection of the robotic charger to the vehicle inlet port is made. In various embodiments, the connection is made using a leading lights system as described in U.S. Pat. No. 8,473,131 incorporated by reference above.

Referring again to FIG. 5, FIG. 5 is illustrated and arranged as three tiers (A, B, and C). Tier A illustrates the exchange of a radio identification of vehicle type by message and extraction from a solid model library stored at the data repository 110 related to the correct model of the corresponding vehicle. Tier B illustrates processing steps that may be performed by the alignment processing system 108. In particular, stereo disparity calculations, depth map creation, point cloud calculations, and alignment via ICP of the referenced model to the point cloud may be performed. Tier C is an "augmented reality" view assembly of the properly placed vehicle model from which an inlet port location can be mathematically inferred and from which "do not travel" collision map data may be established for robot path planning.

As will be appreciated by one skilled in the art, concepts may be embodied as a device, system, method, or computer program product. Accordingly, aspects may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Computer program code for carrying out operations for the concepts may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Concepts are described herein with reference to flowchart illustrations and/or block diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine for example, alignment processing device 108 in FIG. 1, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, cloud-based infrastructure architecture, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for robotic charger alignment comprising:
    receiving at a robotic charger, a device identification of a receiving device;
    retrieving a reference object (RO) of the receiving device from a database indexed by the device identification, wherein the RO is a rigid solid model of the receiving device constructed and arranged of a plurality of triangulated physical dimensions that collectively specify a spatial surface corresponding to a physical surface of the receiving device, the database further storing six floating point data points of the RO indicating the offset from a reference point of the RO to an inlet port of the receiving device;
    imaging the receiving device to form at least two images having an angle therebetween with respect to a common location on the receiving device;
    calculating, by an alignment processing device, a stereo disparity depth map from the at least two images;
    acquiring point cloud from the stereo disparity depth map;
    generating, by the alignment processing device, rotation and translation data by aligning the RO to the acquired point cloud;
    applying an augmented reality alignment of the rigid solid model to sense data from the receiving device using the generated rotation and translation data to infer a location of the inlet port from the RO; and
    moving the robotic charger proximal to the location of the inferred inlet port.

2. The method of claim 1 wherein the Rot and T data are generated with an iterative closest point (ITC) method.

3. The method of claim 1 further comprising connecting the robotic charger to the inlet port using leading lights.

4. The method of claim 1 wherein the device identification is received with a machine-to-machine radio interface.

5. The method of claim 1 wherein the robotic charger is moved proximal to the inlet port through a path defined by a collision map.

6. The method of claim 5, further comprising moving the robotic charger along an indirect path, defined by the collision map generated by the translated and rotated reference object to avoid other vehicle features or intervening objects.

7. The method of claim 1 wherein the receiving device is an electric vehicle, and the inlet port is a vehicle inlet port.

8. A method for alignment of a robotic charger to a three dimensional object, comprising:
    generating, by each of at least one two dimensional camera separated by a predetermined distance, an image of the three dimensional object;
    calculating, by an alignment processing device, a stereo disparity depth map from the images;
    acquiring point cloud from the stereo disparity depth map;
    retrieving from a data repository a reference object of the three dimensional object;
    aligning the reference object with the acquired point cloud;
    inferring a location of a region of interest of the reference object, including applying an augmented reality alignment of a rigid solid model of the reference object to sense data from the 3D object using rotation and translation data generated in response to aligning the location of the region of interest; and
    moving a robotic apparatus proximal to the region of interest in response to inferring the location of the region of interest.

9. The method of claim 8, wherein the three dimensional object is a vehicle including a battery to be charged by a charger of the robotic apparatus.

10. The method of claim 8, wherein the at least one two dimensional camera includes stereo cameras, a pair of charge coupled devices or complementary metal-oxide-semiconductor cameras that capture a left and a right image of the region of interest.

11. The method of claim 8, wherein the stereo disparity depth map is calculated from the left and right images using a disparity technique.

12. The method of claim 8, wherein inferring a location of the region of interest of the reference object comprises:
generating an augmented reality scene from the reference object and the two images; and rotating and translating the reference object in the augmented reality scene.

13. A system for object detection and alignment of a robotic charger with a vehicle to be charged by the robotic charger, comprising:
a sensing device that captures images of a region of interest of the vehicle from two different angles; and
an alignment processing device that calculates a stereo disparity depth map from the images, generates an acquired point cloud from the stereo disparity depth map, compares the acquired point cloud and a reference object of the vehicle, and infers a location of a region of interest of the vehicle in response to the comparison, wherein the reference object is a rigid solid model of the vehicle constructed and arranged of a plurality of triangulated physical dimensions that collectively specify a spatial surface corresponding to a physical surface of the vehicle, the alignment processing device inferring the location of the region of interest of the vehicle by processing six floating point data points of the reference object indicating the offset from a reference point of the reference object to the region of interest, and wherein the alignment processing device further applies an augmented reality alignment of the rigid solid model to sense data from the vehicle using the at least a rotation and translation of the six floating point date points to infer the location of the region of interest.

14. The system of claim 13, wherein the vehicle is an electric or hybrid vehicle.

15. The system of claim 14, wherein the region of interest of the vehicle is a charging inlet.

16. The system of claim 13, wherein the robotic charger is aligned with the region of interest in response to the alignment processing device inferring the location of the region of interest.

17. The system of claim 13, further comprising a data repository that stores a library of reference objects, including the reference object of the vehicle.

18. The system of claim 13, wherein the sensing device includes a pair of charge coupled devices or complementary metal-oxide-semiconductor cameras that capture a left and a right image of the region of interest of the vehicle.

19. The system of claim 13, wherein the alignment processing device generates rotation and translation data to align the reference object with the generated acquired point cloud.

20. The method of claim 1, wherein the point cloud includes a 3D sparse point cloud representation of the receiving vehicle, wherein acquiring the point cloud from the stereo disparity depth map includes the sparse point cloud representation of the receiving vehicle, and wherein aligning the RO to the acquired point cloud allows for the rotation and translation data for sub components of the reference vehicle, including the inlet port, to be inferred.

* * * * *